US011797578B2

(12) United States Patent
Vandeventer et al.

(10) Patent No.: US 11,797,578 B2
(45) Date of Patent: Oct. 24, 2023

(54) TECHNOLOGIES FOR UNSUPERVISED DATA CLASSIFICATION WITH TOPOLOGICAL METHODS

(71) Applicant: SECOND SIGHT DATA DISCOVERY, LLC, Bloomington, IN (US)

(72) Inventors: Reuben Vandeventer, Bloomington, IN (US); Terrence Kunstek, Zionsville, IN (US)

(73) Assignee: Second Sight Data Discovery, LLC, Bloomington, IN (US)

( * ) Notice: Subject to any disclaimer, the term of this patent is extended or adjusted under 35 U.S.C. 154(b) by 79 days.

(21) Appl. No.: 17/518,068

(22) Filed: Nov. 3, 2021

(65) Prior Publication Data

US 2022/0138229 A1    May 5, 2022

Related U.S. Application Data

(60) Provisional application No. 63/109,505, filed on Nov. 4, 2020.

(51) Int. Cl.
| | | |
|---|---|---|
| *G06F 7/00* | (2006.01) | |
| *G06F 16/28* | (2019.01) | |
| *G06N 20/00* | (2019.01) | |
| *G06F 16/23* | (2019.01) | |
| *G06F 16/22* | (2019.01) | |

(52) U.S. Cl.
CPC .......... *G06F 16/285* (2019.01); *G06F 16/221* (2019.01); *G06F 16/2365* (2019.01); *G06N 20/00* (2019.01)

(58) Field of Classification Search
CPC .. G06F 16/285; G06F 16/221; G06F 16/2365; G06N 20/00
USPC .................................................. 707/600–899
See application file for complete search history.

(56) References Cited

U.S. PATENT DOCUMENTS

| | | | |
|---|---|---|---|
| 2009/0132568 A1 | 5/2009 | Syeda-Mahmood | |
| 2014/0222530 A1 | 8/2014 | Wegner et al. | |
| 2015/0356163 A1* | 12/2015 | Matteson | .............. G06F 16/285 |
| | | | 707/738 |

OTHER PUBLICATIONS

Scheeder et al. "Machine learning and image-based profiling in drug discovery." Current opinion in systems biology 10 (2018): 43-52. May 26, 2018.

(Continued)

*Primary Examiner* — Isaac M Woo
(74) *Attorney, Agent, or Firm* — Barnes & Thornburg LLP (57) ABSTRACT

Technologies for unsupervised data classification include a computing device that generates a high dimensional profile for each column of a data store that is indicative of topological features of the column. The computing device also analyzes each column using multiple predetermined profiling rules and generates an initial classification for the columns based on profiling rule results. The initial classification may be applied to related columns based on clustering of the columns using the high dimensional profile. The computing device may train a machine learning model based on the initial classification and the high dimensional profile. Input features for training may include the profiling rule results and the high dimensional profile. Classifications may be provided to client devices via a predetermined interface. Other embodiments are described and claimed.

20 Claims, 6 Drawing Sheets

(56) References Cited

OTHER PUBLICATIONS

Lum et al. "Extracting insights from the shape of complex data using topology." Scientific reports 3.1 (2013): 1-8. Feb. 7, 2013.
Rodriguez-Nieva et al. "Identifying topological order through unsupervised machine learning." Nature Physics 15.8 (2019): 790-795. Jun. 24, 2020.
International Search Report and Written Opinion issued for PCT/US2021/057860, dated Feb. 17, 2022.

* cited by examiner

TECHNOLOGIES FOR UNSUPERVISED DATA CLASSIFICATION WITH TOPOLOGICAL METHODS

CROSS-REFERENCE TO RELATED APPLICATION

This application claims priority under 35 U.S.C. § 119(e) to U.S. Provisional Patent Application No. 63/109,505, entitled "TECHNOLOGIES FOR UNSUPERVISED DATA CLASSIFICATION WITH TOPOLOGICAL METHODS," which was filed on Nov. 4, 2020, which is incorporated by reference in its entirety.

BACKGROUND

Large enterprises and other organizations currently store large amounts of data that may be relevant to business needs. The amount of stored data continues to increase. Typically, one or more human analysts may analyze an organization's data. For example, a human analyst may query the data using one or more query languages, or the human analyst may use a profiling tool that samples data in a normalized way or uses learning models to classify the data. Typical approaches for data analysis are thus heavily reliant on manual intervention for tasks such as query construction, evaluation of each column using profiling tools, and model training, and therefore may be time consuming and expensive.

SUMMARY

According to one aspect of the disclosure, a computing device for unsupervised data classification includes a high definition profiler, an object engine, and a proximal classifier. The high definition profiler is to generate a high dimensional profile for each column of a plurality of columns of a data store using a topological method, wherein the high dimensional profile is indicative of a topological feature of the associated column, and cluster the columns of the data store based on the high dimensional profile. The object engine is to analyze each column of the data store using a plurality of predetermined profiling rules to generate a plurality of profiling rule results, wherein each profiling rule result includes an associated weight. The proximal classifier is to generate an initial classification for a first column of the data store based on the profiling rule results, and apply the initial classification of the first column to a cluster of columns of the data store in response to clustering of the columns of the data store and in response to generation of the initial classification.

In an embodiment, the computing device further includes a data sampler to sample data from each column of the data store; wherein to generate the high dimensional profile comprises to generate the high dimensional profile based on the sample data; and wherein to analyze each column of the data store comprises to analyze each column of the data store based on the sample data. In an embodiment, the computing device further includes a data sampler to flatten unstructured data from the data store to generate the plurality of columns of the data store; wherein to generate the high-dimensional profile comprises to generate the high-dimensional profile in response to flattening of the unstructured data; and wherein to analyze each column of the data store comprises to analyze each column of the data store in response to the flattening of the unstructured data. In an embodiment, to generate the high dimensional profile comprises to generate the high dimensional profile based on unstructured data of the data store.

In an embodiment, to analyze each column of the data store comprises to apply the predetermined profiling rules in a plurality of tiers, wherein each tier has a different complexity. In an embodiment, to apply the predetermined profiling rules comprises to match column data against predetermined pattern. In an embodiment, to apply the predetermined profiling rules comprises to match column data against predetermined reference table. In an embodiment, to apply the predetermined profiling rules comprises to execute a predetermined logical test on column data.

In an embodiment, the computing device further includes a feedback manager to: generate a calibration report indicative of the initial classification; receive a corrected classification in response to generation of the calibration report, wherein the corrected classification is indicative of a classification of a second column generated by an analyst; and apply the corrected classification of the second column to a second cluster of columns in response to receipt of the corrected classification.

In an embodiment, the computing device further includes a model trainer to train a classification model based on the initial classification and the high dimensional profile. In an embodiment, to train the classification model comprises to train the classification model on input features including the profiling rule results and the high dimensional profile. In an embodiment, the input features further include a tier identifier and a precision score associated with the predetermined profiling rule for each profiling rule result. In an embodiment, the computing device further includes a classification application programming interface to provide a classification of a second column of the data store to a client device via a predetermined interface in response to training of the classification model. In an embodiment, to provide the classification comprises to select a classification of the second column from a corrected classification, the classification model, or the initial classification. In an embodiment, to select the classification comprises to: determine whether a corrected classification exists for the second column and select the corrected classification in response to a determination that the corrected classification exists; determine whether a classification exists for the second column with the classification model and select the classification model in response to a determination that the corrected classification does not exist and in response to a determination that the classification exists with the classification model; and select the initial classification in response to the determination that the corrected classification does not exist and in response to a determination that the classification does not exist with the classification model.

According to another aspect, a method for unsupervised data classification includes: generating, by a computing device, a high dimensional profile for each column of a plurality of columns of a data store using a topological method, wherein the high dimensional profile is indicative of a topological feature of the associated column; clustering, by the computing device, the columns of the data store based on the high dimensional profile; analyzing, by the computing device, each column of the data store using a plurality of predetermined profiling rules to generate a plurality of profiling rule results, wherein each profiling rule result includes an associated weight; generating, by the computing device, an initial classification for a first column of the data store based on the profiling rule results; and applying, by the computing device, the initial classification of the first column to a cluster of columns of the data store in response to clustering the columns of the data store and in response to generating the initial classification.

In an embodiment, the method further includes sampling, by the computing device, sample data from each column of the data store; wherein generating the high dimensional profile comprises generating the high dimensional profile based on the sample data; and wherein analyzing each column of the data store comprises analyzing each column of the data store based on the sample data. In an embodiment, the method further includes flattening, by the computing device, unstructured data from the data store to generate the plurality of columns of the data store; wherein generating the high-dimensional profile comprises generating the high-dimensional profile in response to flattening the unstructured data; and wherein analyzing each column of the data store comprises analyzing each column of the data store in response to flattening the unstructured data. In an embodiment, generating the high dimensional profile comprises generating the high dimensional profile based on unstructured data of the data store.

In an embodiment, analyzing each column of the data store comprises applying the predetermined profiling rules in a plurality of tiers, wherein each tier has a different complexity. In an embodiment, applying the predetermined profiling rules comprises matching column data against predetermined pattern. In an embodiment, applying the predetermined profiling rules comprises matching column data against predetermined reference table. In an embodiment, applying the predetermined profiling rules comprises executing a predetermined logical test on column data.

In an embodiment, the method further includes generating, by the computing device, a calibration report indicative of the initial classification; receiving, by the computing device, a corrected classification in response to generating the calibration report, wherein the corrected classification is indicative of a classification of a second column generated by an analyst; and applying, by the computing device, the corrected classification of the second column to a second cluster of columns in response to receiving the corrected classification.

In an embodiment, the method further includes training, by the computing device, a classification model based on the initial classification and the high dimensional profile. In an embodiment, training the classification model comprises training the classification model on input features including the profiling rule results and the high dimensional profile. In an embodiment, the input features further include a tier identifier and a precision score associated with the predetermined profiling rule for each profiling rule result. In an embodiment, the method further includes providing, by the computing device, a classification of a second column of the data store to a client device via a predetermined interface in response to training the classification model. In an embodiment, providing the classification comprises selecting a classification of the second column from a corrected classification, the classification model, or the initial classification. In an embodiment, selecting the classification comprises: determining whether a corrected classification exists for the second column and selecting the corrected classification in response to determining that the corrected classification exists; determining whether a classification exists for the second column with the classification model and selecting the classification model in response to determining that the corrected classification does not exist and in response to determining that the classification exists with the classification model; and selecting the initial classification in response to determining that the corrected classification does not exist and in response to determining that the classification does not exist with the classification model.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
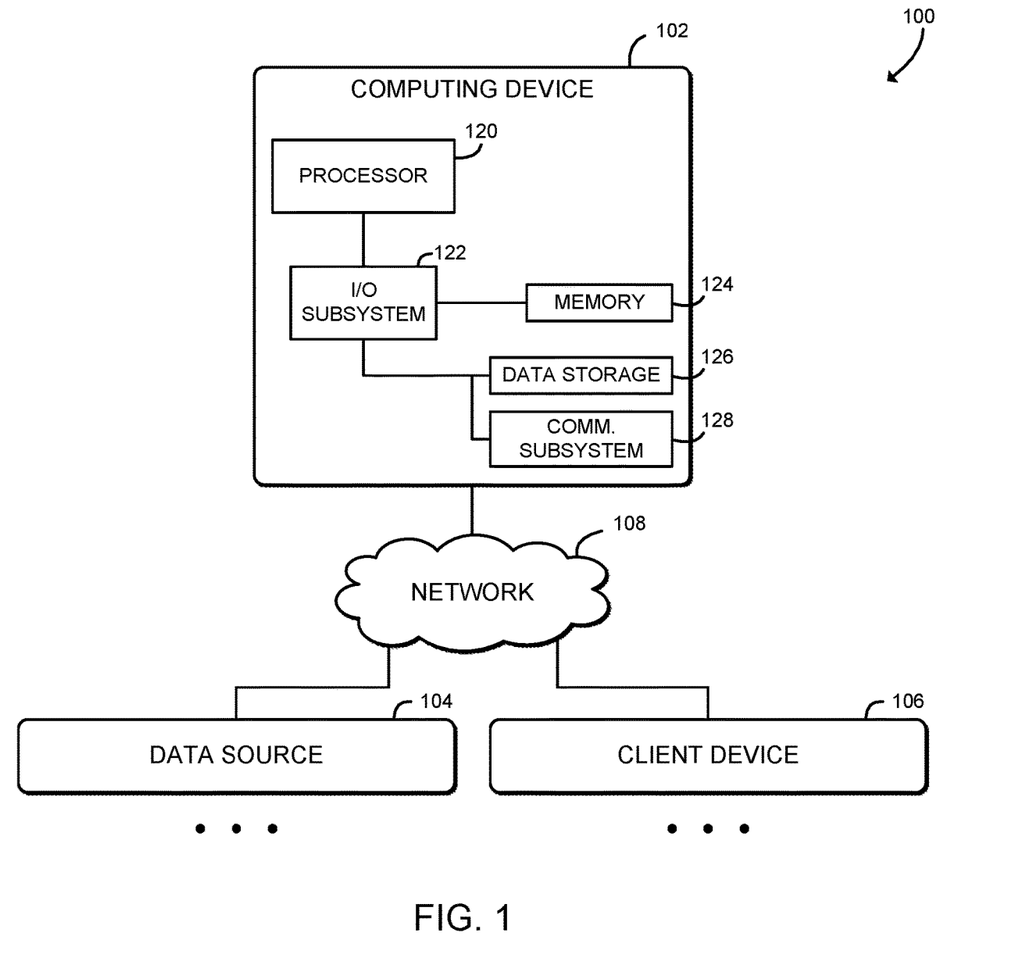
FIG. 1 is a simplified block diagram of at least one embodiment of a system for unsupervised data classification.

Referring now to FIG. 1, an illustrative system 100 for unsupervised data classification includes a computing device 102, which may be in communication with multiple data sources 104 and client devices 106 over a network 108. In use, the computing device 102. In use, as described further below, the computing device 102 accesses a data store that may be provided by one or more data sources 104. The computing device 102 generates a high dimensional profile of each column of the data store using topological methods, and generates an initial classification of each column of the data store using multiple predefined profiling rules. The topological methods may be used to cluster the columns, and the initial classification may be applied to all columns in a cluster. In some embodiments, the computing device 102 may collect analyst feedback to improve the initial classification. The high dimensional profile and the initial classification are used to train a machine learning model to classify the columns. After deploying the machine learning model, the computing device 102 allows access to classifications (e.g., machine learning classifications, initial classifications, or corrected classifications from analyst feedback) through an application programming interface (API), for example to one or more client devices 106.

Thus, the system 100 may allow for analysis of large datasets using fewer resources and/or less human intervention that existing analysis techniques. Additionally, the system 100 may support a high level of parallelization and thus may provide high performance results for large data sets. Further, the system 100 may provide more accurate results as compared to other machine learning analysis techniques.

Figure 5:
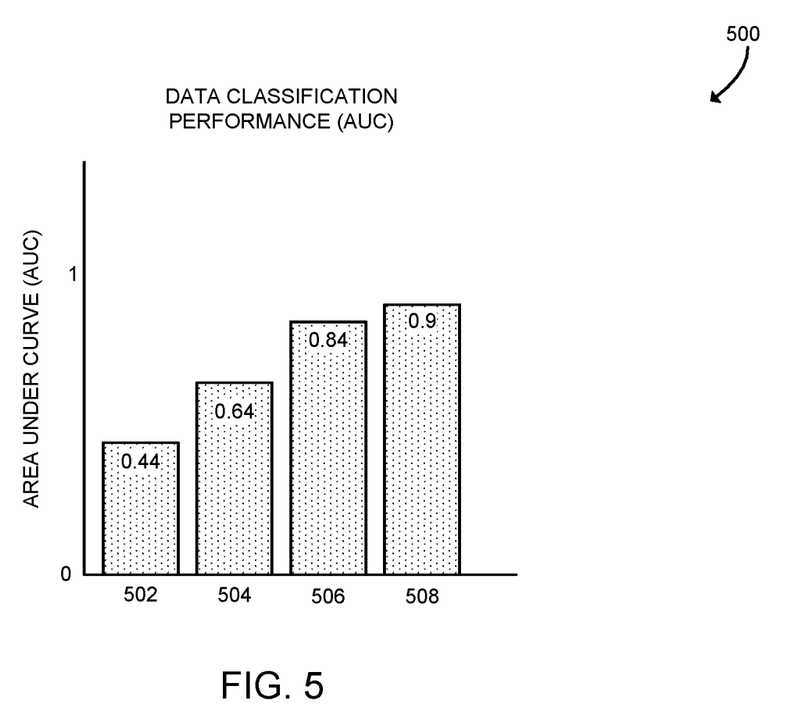
FIG. 5 is a chart illustrating data classification performance that may be achieved by an embodiment of the system of FIGS. 1-3.

Referring now to FIG. 5, diagram 500 illustrates classification performance results for an illustrative classification task that may be achieved by the system 100. In the illustrative classification task, the system 100 classified data in a structured data environment as either sensitive (e.g., name, address, social security number, or other sensitive data category) or nonsensitive. The system 100 performed an initial classification scan of a data set and then collected analyst feedback to improve classification. Performance of the classification was measured using the area under the curve of the receiver characteristic operator (hereinafter, "AUC"). AUC is an aggregate metric that indicates the classification performance of a particular classifier. The AUC value ranges from zero to one, with one indicating perfect performance. Classification and feedback rounds of additional data sets continued until AUC reached about 0.90.

The diagram 500 shows AUC achieved in the first classification for each round of classification. As shown in bar 502, the AUC for the initial classification of the initial data set started at 0.44. As shown in bar 504, AUC for the first classification of the next data set improved to about 0.64 following one round of analyst feedback. Two additional rounds including an initial classification of a data store followed by analyst feedback were performed, as illustrated by bars 506, 508. After four rounds, as shown in the bar 508, AUC was about 0.90. Thus, in the illustrative example, the system 100 achieved the target AUC of 0.90 after four rounds. It was expected that five rounds would be required to achieve an AUC of about 0.90, so the performance of the system 100 was greater than expected. Of course, other performance metrics such as accuracy, $F_1$ score, or precision may also be used to quantify performance of the system 100.

Figure 6:
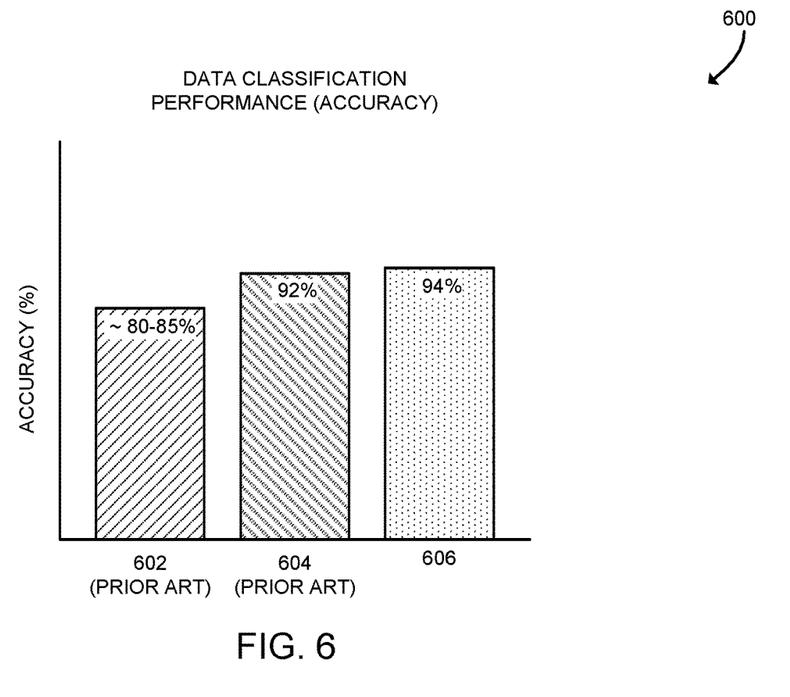
FIG. 6 is a chart comparing data classification performance of the system of FIGS. 1-3 against typical systems.

Referring now to FIG. 6, diagram 600 compares accuracy of the system 100 against other classifiers. Bar 602 illustrates accuracy of a human analyst for identifying sensitive data in structured data stores. As shown, a human is typically only correct about 80-85% of the time when classifying sensitive data. This relatively low accuracy rate may be due to the human analyst being unfamiliar with usage of the data or other human factors. Bar 604 illustrates accuracy for a typical unstructured data classification system, which is about 92% accurate. Note that accuracy for typical automated systems for identifying sensitive data in structured data stores peak at about 65% (not shown). Thus, typical structured data analysis is not even as accurate as a human analyst. Bar 606 illustrates accuracy by the system 100, which is about 94% accurate. Accordingly, the system 100 may perform classification for structured data (and/or unstructured data, semi-structured data or other data) at a higher accuracy than human analysts or typical unstructured data systems.

Figure 7:
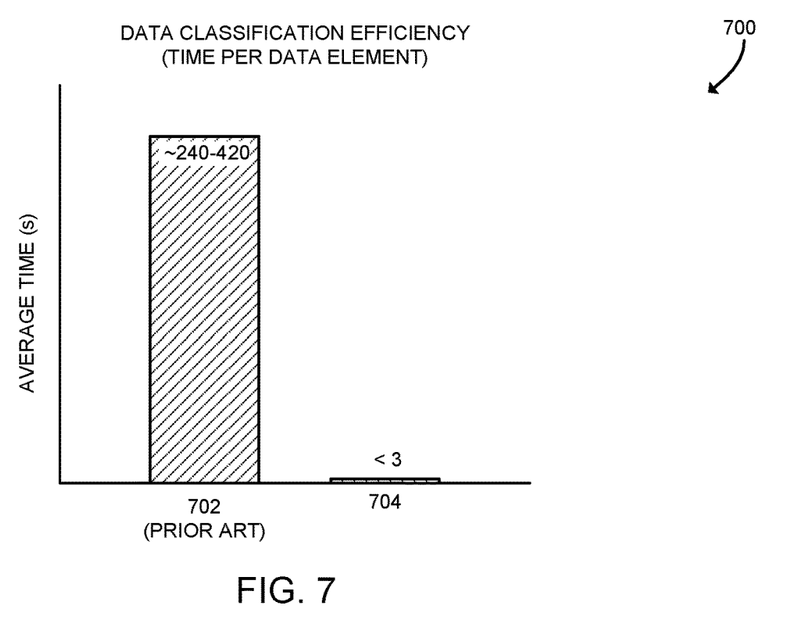
FIG. 7 is a chart comparing efficiency of the system of FIGS. 1-3 against typical systems.

Referring now to FIG. 7, diagram 700 compares data classification efficiency of the system 100 against a typical classifier. As shown in bar 702, a typical classification system using human review and typical data technologies may require between about 240 to 420 seconds per data element to perform classification. As shown in bar 704, the system 100 may require less than three seconds per data element to perform the same classification task, which is about 99% more efficient than the typical system. Accordingly, as shown in FIGS. 6 and 7, the system 100 may provide improved classification performance with improved classification efficiency compared to typical systems. Thus the system 100 may also provide reduced costs compared to existing classification systems, for example by reducing labor costs for human analysts (both for initial classification and for rework) and/or by reducing total cost of ownership for computing technology (e.g., by reducing compute requirements, increasing parallelism, or other improvements). Additionally, the improved efficiency of the system 100 may allow for performing additional processes that are not feasible for typical data systems, such as performing periodic rescanning and monitoring operations.

Referring back to FIG. 1, the computing device 102 may be embodied as any type of device capable of performing the functions described herein. For example, the computing device 102 may be embodied as, without limitation, a server, a rack-mounted server, a blade server, a workstation, a network appliance, a web appliance, a desktop computer, a laptop computer, a tablet computer, a smartphone, a consumer electronic device, a distributed computing system, a multiprocessor system, and/or any other computing device capable of performing the functions described herein. Additionally, in some embodiments, the computing device 102 may be embodied as a "virtual server" formed from multiple computing devices distributed across the network 108 and operating in a public or private cloud. Accordingly, although the computing device 102 is illustrated in FIG. 1 as embodied as a single computing device, it should be appreciated that the computing device 102 may be embodied as multiple devices cooperating together to facilitate the functionality described below. As shown in FIG. 1, the illustrative computing device 102 includes a processor 120, an I/O subsystem 122, memory 124, a data storage device 126, and a communication subsystem 128. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102, the data source 104, the seller computing device 108, the marketplace server 108, and/or other remote devices. The communication subsystem 128 may be configured to use any one or more communication technology (e.g., wireless or wired communications) and associated protocols (e.g., Ethernet, Bluetooth®, Wi-Fi®, WiMAX, etc.) to effect such communication.

Each data source 104 is configured to provide the computing device 102 access to one or more databases or other data stores and otherwise perform the functions described herein. Similarly, each client device 106 is configured to access data classifications provided by the computing device 102 and otherwise perform the functions described herein. Each data source 104 and client device 106 may be embodied as any type of computation or computer device capable of performing the functions described herein, including, without limitation, a computer, a laptop computer, a notebook computer, a tablet computer, a mobile computing device, a wearable computing device, a multiprocessor system, a server, a rack-mounted server, a blade server, a network appliance, a web appliance, a distributed computing system, a processor-based system, and/or a consumer electronic device. Thus, each of the data source 104 and the client device 106 includes components and devices commonly found in a computer or similar computing device, such as a processor, an I/O subsystem, a memory, a data storage device, and/or communication circuitry. Those individual components of the data source 104 and the client device 106 may be similar to the corresponding components of the computing device 102, the description of which is applicable to the corresponding components of the data source 104 and the client device 106 and is not repeated herein so as not to obscure the present disclosure.

As discussed in more detail below, the computing device 102, the data sources 104, and the client devices 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications among the devices of the system 100.

Figure 2:
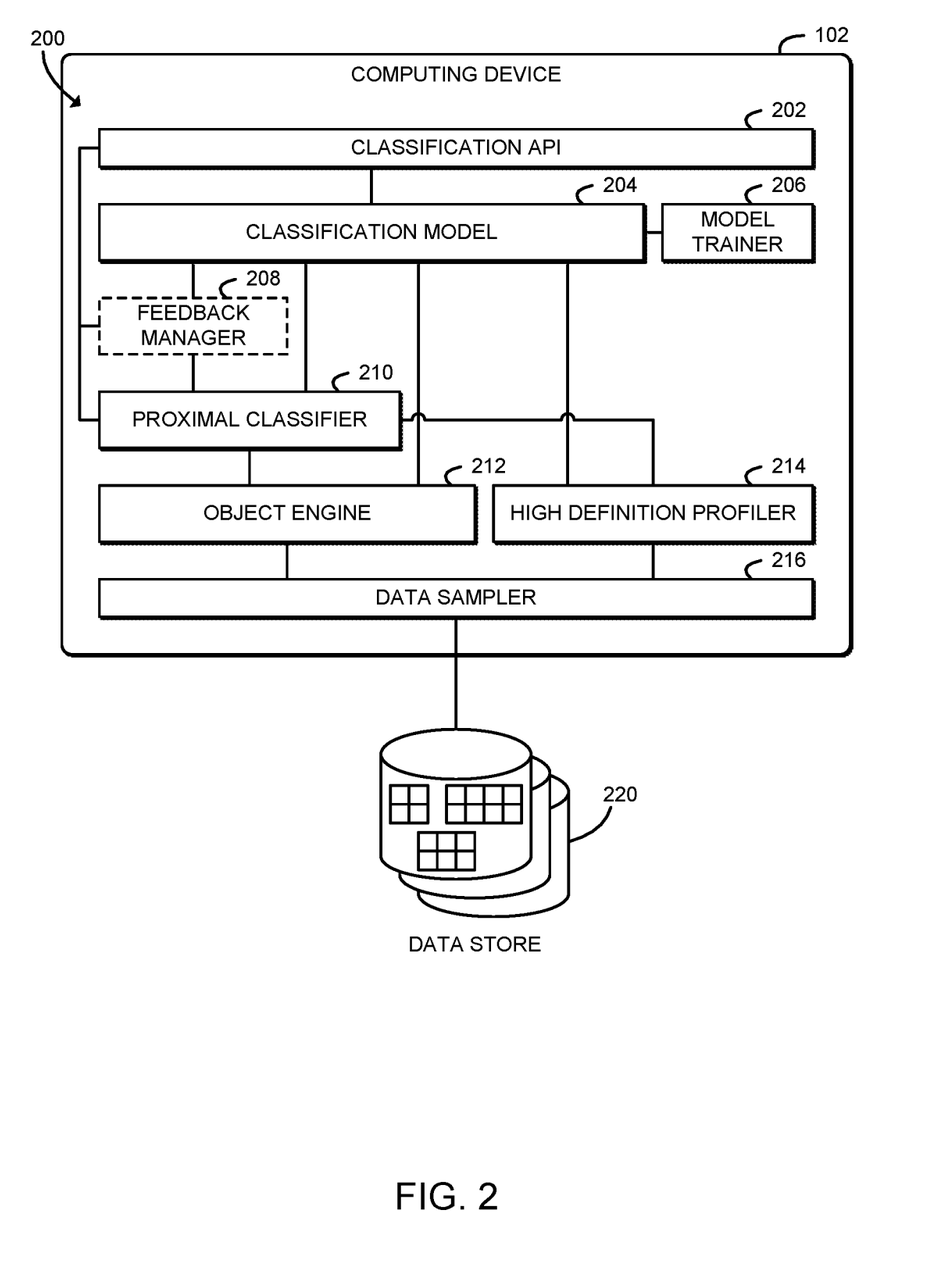
FIG. 2 is a simplified block diagram of an environment that may be established by a computing device of FIG. 1.

Referring now to FIG. 2, in the illustrative embodiment, the computing device 102 establishes an environment 200 during operation. The illustrative environment 200 includes a classification application programming interface (API) 202, a classification model 204, a model trainer 206, in some embodiments a feedback manager 208, a proximal classifier 210, an object engine 212, a high definition profiler 214, and a data sampler 216. The various components of the environment 200 may be embodied as hardware, firmware, software, or a combination thereof. As such, in some embodiments, one or more of the components of the environment 200 may be embodied as circuitry or a collection of electrical devices (e.g., classification API circuitry 202, classification model circuitry 204, model trainer circuitry 206, feedback manager circuitry 208, proximal classifier circuitry 210, object engine circuitry 212, high definition profiler circuitry 214, and/or data sampler circuitry 216. It should be appreciated that, in such embodiments, one or more of those components may form a portion of the processor 120, the I/O subsystem 122, and/or other components of the computing device 102.

The data sampler 216 is configured to sample data from each column of a data store 220. The data store 220 may include one or more databases, data tables, and/or other collections of data. The data store 220 may include structured data, semi-structured data, unstructured data, and/or any combination of structured and unstructured data. The data store 220 may be provided by or otherwise accessed via one or more of the data sources 104. In some embodiments, the data sampler 216 is configured to flatten unstructured data from the data store 220 to generate one or more columns of the data store 220.

The high definition profiler 214 is configured to generate a high dimensional profile for each column of the data store 220 using a topological method. The high dimensional profile may be based on sample data from each column. The high dimensional profile is indicative of a topological feature of the associated column. The high definition profiler 214 is further configured to cluster the columns of the data store 220 based on the high dimensional profile. In some embodiments, the high definition profiler 214 may be configured to generate a high dimensional profile based on unstructured data from the data store 220.

The object engine 212 is configured to analyze each column of the data store 220 using multiple predetermined profiling rules. This analysis generates multiple profiling rule results, which each includes an associated weight. Each column of the data store 220 may be analyzed based on the sample data from each column. Analyzing each column of the data store 220 may include applying the predetermined profiling rules in multiple of tiers, each having a different complexity. The predetermined profiling rules may include matching predetermined patterns, matching predetermined reference tables, or executing predetermined logical tests.

The proximal classifier 210 is configured to generate an initial classification for one or more columns of the data store 220 based on the profiling rule results. The proximal classifier 210 is further configured to apply the initial classification of a column to a cluster of related columns of the data store 220 in response to clustering the columns.

The feedback manager 208 is configured to generate a calibration report indicative of the initial classification and to receive a corrected classification in response to generation of the calibration report. The corrected classification is indicative of a classifications of one or more columns generated by a human analyst. The feedback manager 208 is further configured to apply each corrected classification to a cluster of related columns in response to receiving the corrected classification.

The model trainer 206 is configured to train the classification model 204 based on the initial classification and the high dimensional profile. The classification model 204 may be embodied as an artificial neural network (e.g., a multi-layer perceptron, a recurrent neural network, or other network) a support vector machine, or other machine learning model. Input features for training the classification model 204 may include the profiling rule results and the high dimensional profile, and in some embodiments, a tier identifier and an accuracy associated with each profiling rule result. After training, the classification model 204 is configured to classify columns of the data store 220.

The classification API 202 is configured to provide classifications of columns of the data store 220 to one or more client devices 106 via a predetermined interface in response to training the classification model 204. Providing the classifications may include selecting a classification from a corrected classification, the classification model 204, or the initial classification. Select the classification may include determining whether a corrected classification exists and if so selecting the corrected classification, determining whether a classification exists with the classification model 204 and, if so, selecting the classification model, and selecting the initial classification if the corrected classification does not exist and if the classification does not exist with the classification model 204.

Figure 3:
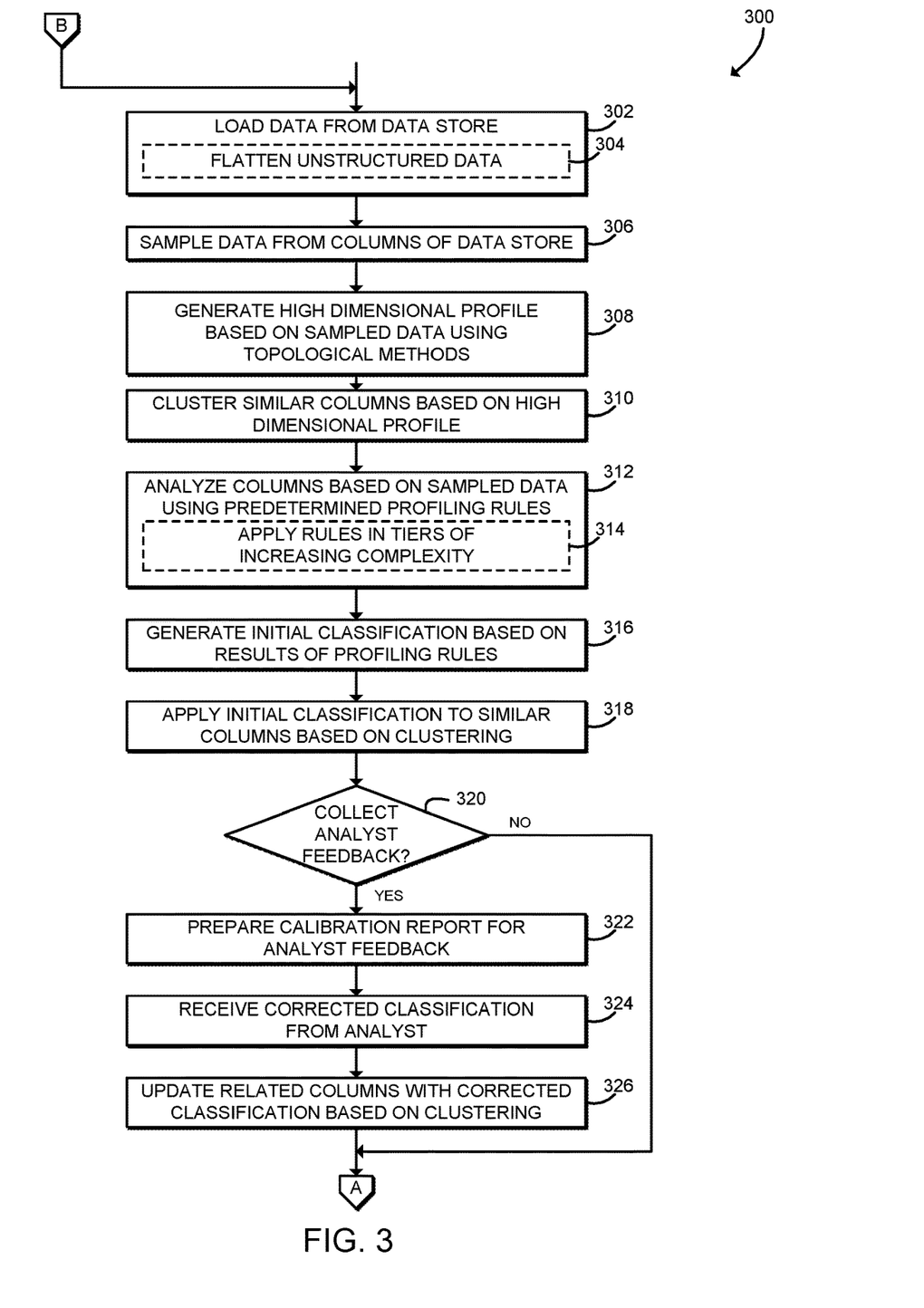
FIGS. 3 and 4 are a simplified flow diagram of at least one embodiment of a method for unsupervised data classification that may be executed by the computing device of FIGS. 1 and 2.
Figure 4:
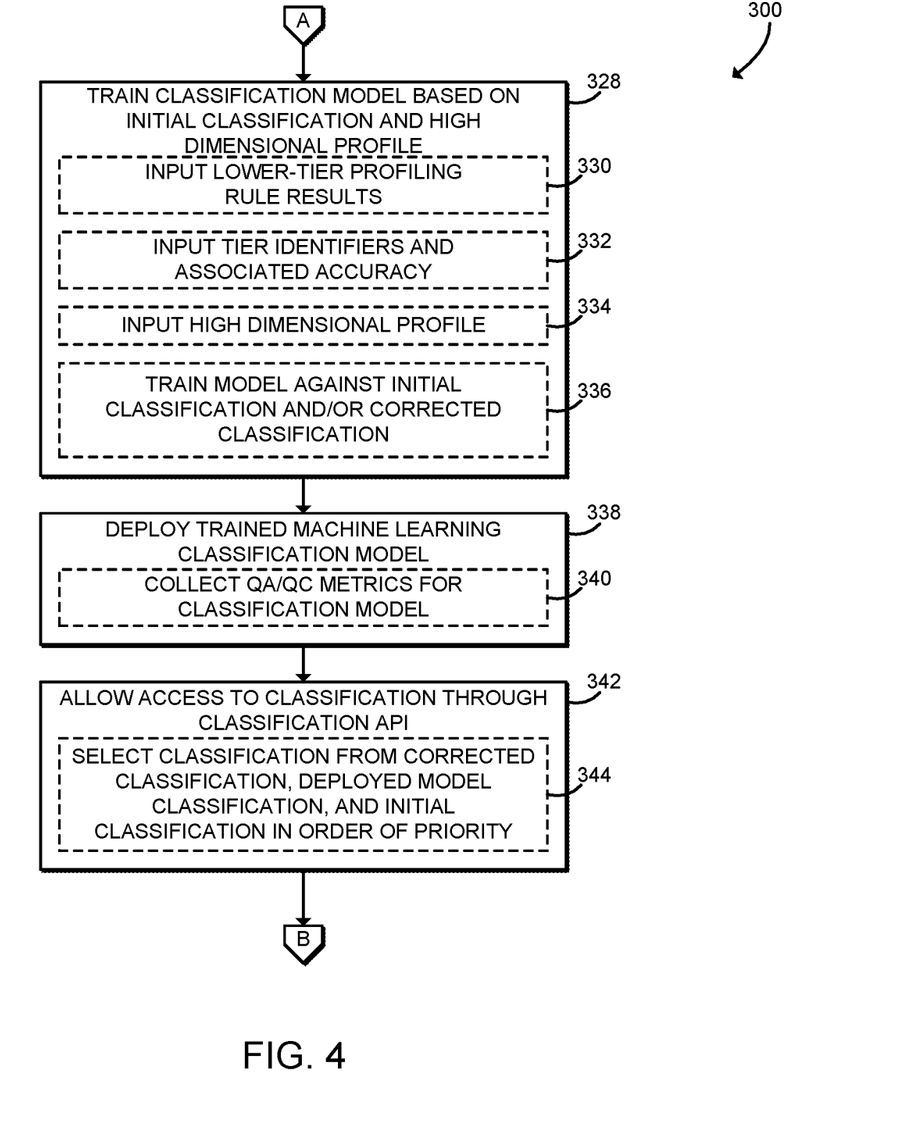

Referring now to FIGS. 3 and 4, in use, the computing device 102 may execute a method 300 for unsupervised data classification. It should be appreciated that, in some embodiments, the operations of the method 300 may be performed by one or more components of the environment 200 of the computing source 102 as shown in FIG. 2. The method 300 begins with block 302, in which the computing device 102 loads data from the data store 220. The computing device 102 may perform any appropriate operation to load the data, such as opening one or more data connections with one or more data sources 104, exporting the data store 220, copying the data store 220, or otherwise accessing the data store 220. The data store 220 includes multiple columns of data, and each column may include many individual data items. Each column has an associated type, which may be a programmatic data type (e.g., number, floating-point number, integer, string, binary, etc.), a semantic data type (e.g., phone number, address, name, identifier, etc.), or other type associated with the column. The columns may be organized in multiple data tables, databases, or other structures and may be associated with metadata such as column name.

In some embodiments, in block 304 the computing device 102 may load unstructured data from the data store 220. Certain data stores 220 may store data in a non-structured or semi-structured format, such as an object database, a document database, a JSON database, a NoSQL database, a file system, or other data store 220. In those embodiments, the computing device 102 may flatten or otherwise parse the unstructured data into columns or other column-like data structures and then perform additional processing on the flattened, column data. For example, the computing device 102 may extract one or more fields from each object of a collection of objects stored in an object-based database and then process the extracted fields similarly to a column of data. Similarly, in some embodiments a traditionally structured data source 220 such as a relational database may include one or more columns that store unstructured data. In those embodiments, the unstructured data stored in the structured data source 220 may also be classified using the same process described further below.

In block 306, the computing device 102 samples data from the columns of the data store 220. The computing device 102 may randomly or otherwise select a small amount of data from each column for further processing. In some embodiments, for small columns (e.g., columns with fewer than 1,000 data items), the computing device 102 may sample the entire column.

In block 308, the computing device 102 generates a high dimensional profile based on the sampled data using one or more topological methods. The computing device 102 may use any appropriate topological method that generates a high dimensional profile of the data. The high dimensional profile may be embodied as a vector or other numeric value that is indicative of one or more topological features of the column. Additionally or alternatively, in some embodiments, the computing device 102 may generate a high dimensional profile based on an unstructured data source such as one or more word processing files, document files, or other files (e.g., DOC or PDF files) from the data store 220.

In block 310, the computing device 102 clusters similar columns of the data store 220 based on the high dimensional profile. Clusters may be identified by comparing the high dimensional profile of each column to the high dimensional profile of all other columns and identifying groups of columns having similar high dimensional profiles. Accordingly, each cluster includes columns that may include similar or the same data. For example, an organization may maintain several copies of a data column in different data tables or other locations in the data store 220, and those copies may diverge over time. Each of those copies (including non-identical or otherwise divergent copies) may be included in a cluster.

In block 312, the computing device 102 analyzes the columns based on the sampled data using multiple predetermined profiling rules. Each profiling rule may be embodied as a pattern or other logical test that may be used to identify the type of the associated column. Results for each profiling rule may be generated for each column. The results may include a probability or other weight indicating how likely the column includes data of the type associated with the profiling rule. In some embodiments, in block 314, the computing device 102 may apply the profiling rules in multiple tiers, with each tier having an increasing level of complexity of the associated rules and/or models. With increasing complexity, each tier may also be associated with higher predicted accuracy or other precision score. The precision score may be embodied as metadata associated with each rule that is indicative of how narrow the rule is (e.g., only triggering if a value fits into a classification) and/or how broad the rule is (e.g., triggering on many different types of data). The precision score may be determined systematically by comparing the number of times a rule triggers a classification versus the number of times that classification is found, which may require additional human input. In some embodiments, the tiers of increasing complexity may be applied in phases, for example starting with the least complicated tier of profiling rules.

As an example of profiling rule tiers, a lower tier of profiling rules may include rules based on regular expressions or other pattern matching operations. That tier of rules may be associated with a relatively low expected accuracy, such as 50%. Continuing that example, a higher tier of profiling rules may include matching against one or more predetermined reference tables or other reference values, and may be associated with a higher accuracy, such as 55%. Still further continuing that example, a higher yet tier of profiling rules may include logical tests, scripts, or other programmatic operations and may be associated with a higher accuracy, such as 60%. Continuing that example, further higher tiers of profiling rules may be based on fuzzy logic/matching and/or any combination of the above. Table 1, below, illustrates five potential profiling rules that are in varying tiers. Rules $O_1$ and $O_2$ are in Tier 2 and identify Social Security numbers and ages, respectively, for example using one or more regular expressions. Rules $O_3$ and $O_4$ are in Tier 3 and identify phone numbers and U.S. states by matching against predetermined reference tables (e.g., of valid phone numbers and/or U.S. states) Rule $O_5$ is in Tier 4 and identifies whether a column includes a valid credit card number, for example by performing a checksum operation or other programmatic validation operation. Note that operations in Tier 4 or other higher tiers may include and/or be based on operations performed in lower tiers. For example, rule $O_5$ may perform pattern matching to identify potential credit card numbers before performing the validation operation.

TABLE 1

Example profiling rules and tiers.

| Rule | Tier | Classification |
|------|------|----------------|
| $O_1$ | 2 | SSN |
| $O_2$ | 2 | Age |
| $O_3$ | 3 | Phone |
| $O_4$ | 3 | Address (State) |
| $O_5$ | 4 | Valid Credit Card |

Continuing the example, Table 2 below shows the results for each profiling rule $O_1$ through $O_5$ as applied to multiple columns C. As shown, the results of each profiling rule $O_1$ through $O_5$ may be represented by a numeric value. Higher values indicate that the column is more likely to include data matching the classification associated with the corresponding profiling rule.

TABLE 2

Example profiling rule results.

| Results | $O_1$ | $O_2$ | $O_3$ | $O_4$ | $O_5$ |
|---------|-------|-------|-------|-------|-------|
| $C_1$ | 0.25 | 0 | 1.0 | 0 | 0 |
| $C_2$ | 0 | 6.0 | 0 | 0 | 0 |
| $C_n$ | 0 | 0.75 | 0.33 | 0 | 0 |

After generating the profiling rule results, in block 316 the computing device 102 generates an initial classification for one or more columns based on the profiling rule results. The computing device 102 may perform a deterministic process based on the profiling rule results and the expected accuracy associated with each profiling rule and/or tier to select a likely classification for each column. In block 318, the computing device 102 may apply the initial classification to similar classifications based on the clustering of columns. For example, the computing device 102 may determine an initial classification for one column within a cluster and then apply that classification to all other columns in the cluster. Of course, in some embodiments, the initial classification may be applied to every column, regardless of clustering. As described further below, in some embodiments a cluster of columns with dissimilar initial classifications may be an input for analyst feedback that may be used to improve model performance.

In block 320, the computing device 102 determines whether to collect analyst feedback. Collecting analyst feedback may allow the computing device 102 to improve accuracy or otherwise improve classification performance by incorporating human review of classification operations. Of course, analyst feedback is not required and the computing device 102 may perform classification in a fully automated matter. If the computing device 102 determines not to collect analyst feedback, the method 300 branches ahead to block 328, shown in FIG. 4 and described below. If the computing device 102 determines to collect analyst feedback, the method 300 advances to block 322.

In block 322, the computing device 102 prepares a calibration report for analyst feedback. The calibration report may include information usable by a human analyst to evaluate classification performance of the initial classification. For example, the calibration report may include one or more most likely classifications for each column. The calibration report may be transmitted to or otherwise accessed by a human analyst.

In block 324, the computing device 102 receives a corrected classification from the human analyst. The corrected classification may include one or more classifications identified by the analyst as correct for an associated column. In block 326, the computing device 102 may update one or more related columns with the corrected classification based on clustering of the data store 220. For example, the computing device 102 may update the classification of each column in a cluster to match the corrected classification received from the analyst. After updating the related columns, the method 300 advances to block 328, shown in FIG. 4.

Referring now to FIG. 4, in block 328 the computing device 102 trains the classification model 204 based on the initial classification and the high dimensional profile. The computing device 102 may use any appropriate training algorithm that prepares the classification model 204 to classify columns. In some embodiments, in block 330 input features for training may include lower-tier profiling rule results. For example, the input features may include results for pattern matching rules, reference table rules, logical rules, or other profiling rule results. In some embodiments, in block 332 input features may include tier identifiers and/or associated expected accuracies for each profiling rule results. For example, in those embodiments the classification model 204 may be trained to favor profiling rules from certain tiers based on the training. In some embodiments, in block 334 the input features may include the high dimensional profile. Thus, the classification model 204 may be trained on a rich feature set including topological features of the data. In some embodiments, in block 336 the computing device 102 trains the classification model 204 against the initial classification and/or the corrected classification determined as described above. For example, the initial and/or corrected classification may be used as labels for training the classification model 204. When analyst feedback has been received, the corrected classification may be used for training in favor of the initial classification.

In block 338, the computing device 102 deploys the trained machine learning classification model 204. When deployed, the classification model 204 may classify columns of the data store 220. In some embodiments, in block 340 the computing device 102 may collect quality assurance or quality control metrics for evaluation of performance of the classification model 204. Such metrics may measure performance of the classification model 204 as it classifies additional data over time.

In block 342, the computing device 102 allows access to classification of the data store through the classification API 202. The classification API 202 may be embodied as a remote interface, a local interface, or other defined interface for accessing classifications and/or other functions performed by the computing device 102. In particular, the classification API 202 may allow a client device 106 to request a classification for a certain column of the data store 220. In some embodiments, in block 344 the computing device 102 may select a classification from the corrected classification, the deployed classification model 204, and the initial classification. The classification may be selected in that order of priority in the event that classifications do not match. For example, when processing a request for a classification of a particular column, the computing device 102 may determine whether a corrected classification for that column has been received from a human analyst. If so, the computing device 102 may select and return that corrected classification to the client device 106. If no corrected classification exists, the computing device 102 may determine if a classification for that column has been generated by the classification model 204. If so, the computing device 102 may select and return that machine-learning-based classification to the client device 106. If no corrected classification exists and no machine learning classification exists, the computing device 102 may determine whether an initial classification for that column exists and, if so, may select and return the initial classification to the client device 106. Thus, the computing device 102 may return the most accurate classification available for the requested column. After allowing access to the classifications, the method 300 loops back to block 302 shown in FIG. 3 to continue performing unsupervised data classification.

Although illustrated in FIGS. 3 and 4 as being performed serially, it should be understood that in some embodiments one or more operations of the method 300 may be performed in parallel or in another order. For example, in some embodiments the generation of the high dimensional profile and the clustering operations of blocks 308, 310 may be performed in parallel with the analysis of columns using the profiling rules and the initial classification of blocks 312, 316.

The invention claimed is:

1. A computing device for unsupervised data classification, the computing device comprising:
    a high definition profiler to (i) generate a high dimensional profile for each column of a plurality of columns of a data store using a topological method, wherein the high dimensional profile is indicative of a topological feature of the associated column, and (ii) cluster the columns of the data store based on the high dimensional profile, wherein each column comprises a collection of values having an associated type, and wherein each value of the collection of values is associated with a corresponding data item of the data store;
    an object engine to analyze each column of the data store using a plurality of predetermined profiling rules to generate a plurality of profiling rule results, wherein each profiling rule result includes an associated weight; and
    a proximal classifier to (i) generate an initial classification for a first column of the data store based on the profiling rule results, and (ii) apply the initial classification of the first column to a cluster of columns of the data store in response to clustering of the columns of the data store and in response to generation of the initial classification.

2. The computing device of claim 1, further comprising:
    a data sampler to sample data from each column of the data store;
    wherein to generate the high dimensional profile comprises to generate the high dimensional profile based on the sample data; and
    wherein to analyze each column of the data store comprises to analyze each column of the data store based on the sample data.

3. The computing device of claim 1, wherein to analyze each column of the data store comprises to apply the predetermined profiling rules in a plurality of tiers, wherein each tier has a different complexity.

4. The computing device of claim 3, wherein to apply the predetermined profiling rules comprises to match column data against a predetermined pattern, to match column data against a predetermined reference table, or to execute a predetermined logical test on column data.

5. The computing device of claim 1, further comprising a feedback manager to:
    generate a calibration report indicative of the initial classification;
    receive a corrected classification in response to generation of the calibration report, wherein the corrected classification is indicative of a classification of a second column generated by an analyst; and
    apply the corrected classification of the second column to a second cluster of columns in response to receipt of the corrected classification.

6. The computing device of claim 1, further comprising a model trainer to train a classification model based on the initial classification and the high dimensional profile.

7. The computing device of claim 6, wherein to train the classification model comprises to train the classification model on input features including the profiling rule results and the high dimensional profile.

8. The computing device of claim 7, wherein the input features further include a tier identifier and a precision score associated with the predetermined profiling rule for each profiling rule result.

9. The computing device of claim 6, further comprising a classification application programming interface to provide a classification of a second column of the data store to a client device via a predetermined interface in response to training of the classification model.

10. The computing device of claim 9, wherein to provide the classification comprises to select a classification of the second column from a corrected classification, the classification model, or the initial classification, wherein to select the classification comprises to:
   determine whether a corrected classification exists for the second column and select the corrected classification in response to a determination that the corrected classification exists;
   determine whether a classification exists for the second column with the classification model and select the classification model in response to a determination that the corrected classification does not exist and in response to a determination that the classification exists with the classification model; and
   select the initial classification in response to the determination that the corrected classification does not exist and in response to a determination that the classification does not exist with the classification model.

11. One or more computer-readable storage media comprising a plurality of instructions that in response to being executed cause a computing device to:
   generate a high dimensional profile for each column of a plurality of columns of a data store using a topological method, wherein the high dimensional profile is indicative of a topological feature of the associated column, wherein each column comprises a collection of values having an associated type, and wherein each value of the collection of values is associated with a corresponding data item of the data store;
   cluster the columns of the data store based on the high dimensional profile;
   analyze each column of the data store using a plurality of predetermined profiling rules to generate a plurality of profiling rule results, wherein each profiling rule result includes an associated weight;
   generate an initial classification for a first column of the data store based on the profiling rule results; and
   apply the initial classification of the first column to a cluster of columns of the data store in response to clustering the columns of the data store and in response to generating the initial classification.

12. The one or more computer-readable storage media of claim 11, further comprising a plurality of instructions that in response to being executed cause the computing device to:
   sample data from each column of the data store;
   wherein to generate the high dimensional profile comprises to generate the high dimensional profile based on the sample data; and
   wherein to analyze each column of the data store comprises to analyze each column of the data store based on the sample data.

13. The one or more computer-readable storage media of claim 11, wherein to analyze each column of the data store comprises to apply the predetermined profiling rules in a plurality of tiers, wherein each tier has a different complexity.

14. The one or more computer-readable storage media of claim 11, further comprising a plurality of instructions that in response to being executed cause the computing device to:
   generate a calibration report indicative of the initial classification;
   receive a corrected classification in response to generating the calibration report, wherein the corrected classification is indicative of a classification of a second column generated by an analyst; and
   apply the corrected classification of the second column to a second cluster of columns in response to receiving the corrected classification.

15. The one or more computer-readable storage media of claim 11, further comprising a plurality of instructions that in response to being executed cause the computing device to train a classification model based on the initial classification and the high dimensional profile.

16. The one or more computer-readable storage media of claim 15, further comprising a plurality of instructions that in response to being executed cause the computing device to provide a classification of a second column of the data store to a client device via a predetermined interface in response to training the classification model.

17. A method for unsupervised data classification, the method comprising:
   generating, by a computing device, a high dimensional profile for each column of a plurality of columns of a data store using a topological method, wherein the high dimensional profile is indicative of a topological feature of the associated column, wherein each column comprises a collection of values having an associated type, and wherein each value of the collection of values is associated with a corresponding data item of the data store;
   clustering, by the computing device, the columns of the data store based on the high dimensional profile;
   analyzing, by the computing device, each column of the data store using a plurality of predetermined profiling rules to generate a plurality of profiling rule results, wherein each profiling rule result includes an associated weight;
   generating, by the computing device, an initial classification for a first column of the data store based on the profiling rule results; and
   applying, by the computing device, the initial classification of the first column to a cluster of columns of the data store in response to clustering the columns of the data store and in response to generating the initial classification.

18. The method of claim 17, further comprising:
   sampling, by the computing device, sample data from each column of the data store;
   wherein generating the high dimensional profile comprises generating the high dimensional profile based on the sample data; and
   wherein analyzing each column of the data store comprises analyzing each column of the data store based on the sample data.

19. The method of claim 17, wherein analyzing each column of the data store comprises applying the predetermined profiling rules in a plurality of tiers, wherein each tier has a different complexity.

20. The method of claim 17, further comprising training, by the computing device, a classification model based on the initial classification and the high dimensional profile.

* * * * *